US009177580B1

(12) United States Patent  
Vanderheyden et al.

(10) Patent No.: US 9,177,580 B1  
(45) Date of Patent: Nov. 3, 2015

(54) TAPE DRIVE WITH HEAD ASSEMBLY HAVING DUAL OFFSET DEVICES

(71) Applicant: ORACLE INTERNATIONAL CORPORATION, Redwood City, CA (US)

(72) Inventors: William J. Vanderheyden, Broomfield, CO (US); Darryl Wayne Yeakley, Erie, CO (US); Steven G. Trabert, Boulder, CO (US)

(73) Assignee: ORACLE INTERNATIONAL CORPORATION, Redwood City, CA (US)

( * ) Notice: Subject to any disclaimer, the term of this patent is extended or adjusted under 35 U.S.C. 154(b) by 0 days.

(21) Appl. No.: 14/658,419

(22) Filed: Mar. 16, 2015

(51) Int. Cl.  
*G11B 5/58* (2006.01)

(52) U.S. Cl.  
CPC ........................................ *G11B 5/58* (2013.01)

(58) Field of Classification Search  
None  
See application file for complete search history.

(56) References Cited

U.S. PATENT DOCUMENTS

| 7,054,093 | B1 * | 5/2006 | Anderson et al. | 360/75 |
| 7,054,097 | B1 * | 5/2006 | Yip et al. | 360/77.12 |
| 7,342,738 | B1 * | 3/2008 | Anderson et al. | 360/77.12 |

\* cited by examiner

*Primary Examiner* — K. Wong  
(74) *Attorney, Agent, or Firm* — Marsh Fischmann & Breyfogle LLP; Kent A. Lembke; Bryan Rech (57) ABSTRACT

A recording head assembly that includes two side-by-side and separately actuated heads. To increase tape capacity while controlling tape mis-registration, write elements are provided in two subsets with a first subset provided on a first of the two heads and a second subset provided on the second of the two heads. The two subsets are offset a distance along the direction of travel for a tape (or horizontal offset) while the two subsets of write elements are also offset along the longitudinal axes of the heads (or bumps on the heads) such that a first subset acts as the upper half of the write element set and a second subset acts as the lower half of the write element set. The subsets of write elements simultaneously writes data, and a similar arrangement can be provided for two subsets of read elements that are aligned with the write elements.

25 Claims, 6 Drawing Sheets

TAPE DRIVE WITH HEAD ASSEMBLY HAVING DUAL OFFSET DEVICES

BACKGROUND

1. Field of the Invention

The present invention generally relates to tape drives and, more particularly, recording (or read/write) heads of tape drives adapted to reduce or control track mis-registration (TMR) to facilitate recording with increased track density, which leads to increased storage capacity.

2. Relevant Background

Tape drives have been widely employed in industry for over thirty years due to their ability to store large amounts of data on a relatively small and inexpensive removable format. Typically, tape drives use a storage tape that is wound between a pair of tape reels as data is transferred to or from the tape media via a read/write tape head assembly. In one arrangement, one of the reels (e.g., the "take-up" reel) is part of the tape drive while the other reel (e.g., the "cartridge" or "supply" reel) is part of a removable cartridge. Upon insertion of the cartridge into the tape drive, the storage tape on the cartridge reel is coupled to the take-up reel of the tape drive (e.g., via respective leaders). After coupling, the tape is unwound from the cartridge reel, moved past the tape head assembly and wound onto the take-up reel via a drive motor. Next, the tape is unwound from the take-up reel, moved past the tape head assembly and wound onto the cartridge. Subsequently, the storage tape is uncoupled from the take-up reel, prior to removing the cartridge from the tape drive. In another arrangement, both reels are part of a cassette which is inserted into a tape drive and driven by a drive motor.

To increase the storage density and reduce the access time of magnetic tapes, a popular trend is towards multi-head, multi-channel head structures with narrowed recording gaps and data track widths so that many linear data tracks may be manipulated on a tape medium of a predetermined width (e.g., such as one-half inch width tape) passing by the head structures at increasingly faster rates of speed. However, various factors work against the ability of existing and planned tape drives to achieve such increased storage densities and reduced access times.

In a tape drive system, the misalignment of a data reader to a previously written track is a critical factor that affects capacity. In the data storage industry, this misalignment is typically referred to as track mis-registration (TMR), and TMR is affected by many variables with one of the largest variables being tape dimensional stability (TDS). TMR due to TDS is generally calculated by multiplying a tape distortion factor of a particular media (e.g., magnetic storage tape used in a tape cartridge used with a tape drive) by one half the writer element span of a recording head of read/write head assembly. The writer element span is a linear measurement of the distance between outer elements on a bump of the recording head. TMR due to TDS is caused by changes in the width of the media or tape between the time it is written by write elements and the time it is later read by read elements, and these changes in width can be due to factors (that together define the tape distortion factor) such as the media's coefficient of thermal expansion, creep, and coefficient in tension.

TMR can limit how many tracks can be written on tape, and, as a result, TMR needs to be addressed during the design of recording heads because the industry's goal for each new generation of tape drives is to double the capacity for a particular tape width. For example, a typical product evolution for a tape drive would be to design a head to have the same number of write elements (e.g., 32 elements) but space these elements closer together so as to span half the width of those in a previous generation head (i.e., to have a write element span that is reduced by fifty percent). The number of servo bands then would be doubled on the media, which would require the development of a new servo pattern. Further, the new tape drive may have to meet the design requirement that it be able to read tapes written by the previous generation tape drives and to write tapes that are readable by the previous generation tape drives. To meet these additional requirements, the new tape drive would include additional read and write elements at the channel spacing (e.g., distance between elements on a bump of a head) of the previous generation.

Using this type of head design for each new generation can cause a number of problems or create design and manufacturing challenges. The addition of numerous elements to a head at a tighter pattern and to provide legacy read/write abilities and creation of a new servo pattern adds significantly to the cost and complexity of the tape and the recording head. Further, spacing a particular number of write and/or read elements (e.g., 32 elements) in half a previous span is also a concern due to added manufacturing complexities and due to increased problems with cross talk between the head elements.

As a result, there remains a need for a new design for a tape drive head assembly (or recording head assembly) that is configured to reduce TMR due to TDS so as to allow recording at increased track densities so as to increase capacity.

SUMMARY

Briefly, a new recording head assembly is provided for use with tape drives that is adapted to reduce TMR due to TDS (relative to a typical next generation design that places the same number of read/write elements in half the element span). Specifically, the recording head assembly controls TMR without spacing elements more closely together (i.e., without reduced channel pitch) and also without the need for adding additional read or write elements such as for legacy reading and writing capabilities.

More particularly, a tape drive is provided for recording data on a magnetic storage tape. The tape drive includes a recording head assembly and a drive assembly guiding the magnetic storage tape past the recording head assembly along a tape path. The recording head assembly includes: (a) a first head and a second head spaced apart from the first head; (b) a first subset of write elements arranged linearly on a bump of the first head to extend parallel to a longitudinal axis of the bump of the first head; and (c) a second subset of write elements arranged linearly on a bump of the second head to extend parallel to a longitudinal axis of the bump of the second head. The first and second subsets of the write elements are offset from each other relative to the longitudinal axes of the bumps of the first and second heads. Additionally, the first and second heads may be separately actuatable to position the first and second subsets of the write elements relative to the magnetic storage tape.

In practice, the recording head assembly further includes a first pair of servo readers on the bump of the first head and a second pair of servo readers, aligned with the first pair of servo readers, on the bump of the second head. The first subset of write elements is positioned to span a first portion of a gap between the first pair of servo readers and the second subset of write elements is positioned to span a second portion of a gap between the second pair of servo readers (e.g., to cause the two subsets of write elements to span the distance associated with an original element span of a previous generation head). In some embodiments, the first portion of the gap is a lower half of the gap between the first pair of servo readers and the second portion of the gap is an upper half of the gap between the second pair of servo readers. Also, in most implementations, the recording head assembly is free of additional servo readers, read elements, and right elements between the first and second pairs of servo readers (e.g., no legacy read/write elements are needed nor is there a need for additional servo readers compared to the previous generation design).

In some embodiments, the first and second subsets of write elements are concurrently positioned relative to the magnetic storage tape to write a plurality of tracks within a band of the magnetic storage tape. In specific, but not limiting cases, the first subset of write elements comprises sixteen write elements and wherein the second subset of write elements comprises sixteen write elements, whereby thirty-two elements are provided for concurrently writing data to the band of the magnetic storage tape which may be useful when providing a next generation recording head assembly when the previous generation included thirty-two elements.

Further, in addition to write elements, the recording head assembly further may include: (a) a first subset of read elements arranged linearly on an additional bump of the first head to extend parallel to a longitudinal axis of the additional bump of the first head and to be aligned with the first subset of write elements of the first head, and (b) a second subset of read elements arranged linearly on an additional bump of the second head to extend parallel to a longitudinal axis of the additional bump of the second head and to be aligned with the second subset of write elements of the second head. In such implementations, the first and second subsets of the read elements can be offset from each other relative to the longitudinal axes of the bumps of the first and second heads. In operation, the first and second subsets of the read elements typically are operable to substantially concurrently read differing tracks from a band of the magnetic storage tape. It should be noted, though, that some embodiments of recording head assemblies will include head designs in which the read and write elements are provided on the same bump.

DETAILED DESCRIPTION

Briefly, the present description is directed toward a recording head assembly that includes two side-by-side and separately actuated heads. To increase tape capacity while controlling TMR due to TDS, a set of write elements (such as 32 write elements) are provided in two subsets or segments with a first subset (such as 16 write elements) being provided on a first one of the two heads and a second subset (such as 16 write elements) being provided on the second one of the two heads. The two subsets are thus offset a distance along the direction of travel for a tape (or horizontal offset), but, further, the two subsets of write elements are also offset along the longitudinal axes of the heads (or bumps on the heads) such that a first subset acts as the upper half of the write element set and a second subset acts as the lower half of the write element set.

A similar arrangement is provided for two subsets of read elements that are aligned with these write elements (e.g., 16 read elements provided on one head and 16 read elements on a second head to provide a set of 32 read elements). A pair of servo readers is positioned on the heads in positions and/or with spacings matching the previous generation head so that new servo stripes are not needed. On one head, the first subset of write elements and first subset of read elements are arranged to span a lower or first half of this span between the servo readers while a second subset of the write element and a second subset of the read elements are arranged to span an upper or second half of this span between the servo readers. In this way, the two subsets of write elements (and read elements) are offset in a second manner or offset along the longitudinal axes of the heads (or bumps on the heads) so as to have an overall span matching that of the original element span of the previous generation head. In this way, channel spacing can be maintained between generations of recording head assemblies to address manufacturing and cross talk concerns while reducing the writer and reader element span (on each head) in half relative to the prior generation so that TMR due to TDS is also cut in half relative to more conventional next generation head designs.

Figure 1:
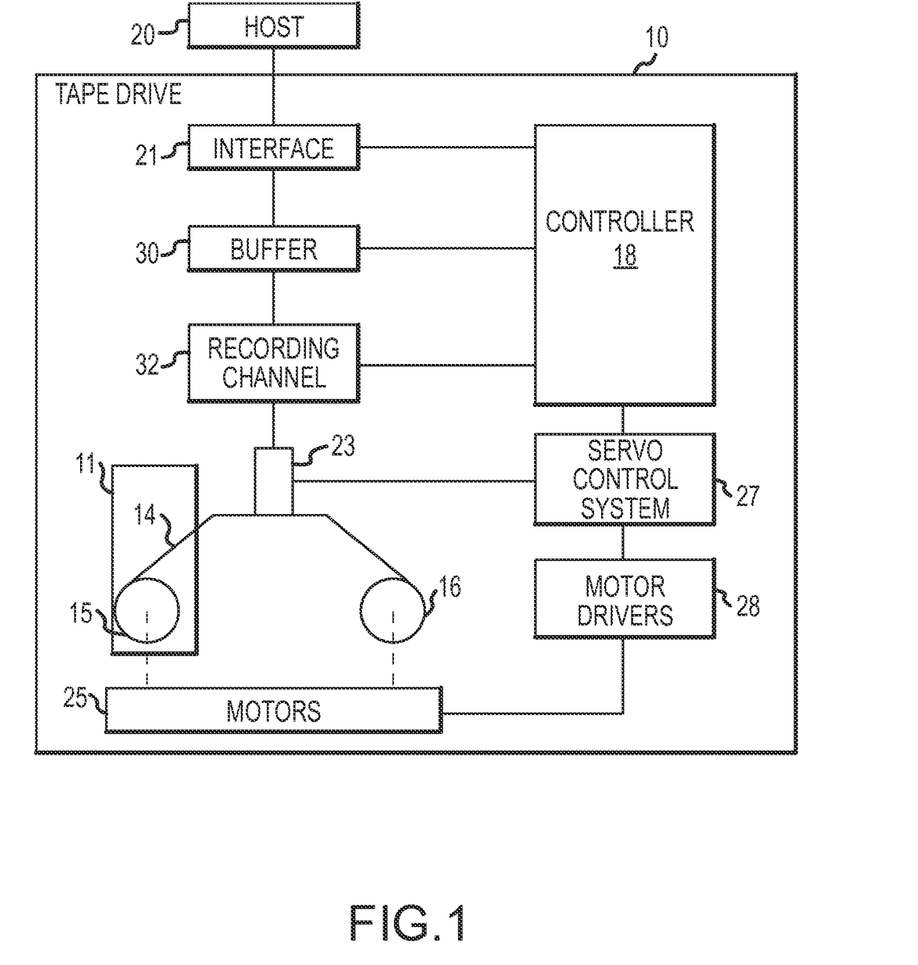
FIG. 1 is a schematic diagram of a tape drive that may incorporate a recording head assembly with dual offset devices recording media with reduced TMR than a conventional next generation tape drive.

Before discussing the recording head assembly presented herein in more detail, it may be useful to disclose one representative environment in which the recording head assembly may be implemented (while it is to be understood, however, that numerous other such contexts are envisioned and encompassed herein). In this regard, FIG. 1 presents a schematic view of an exemplary tape drive 10 within which the disclosed recording head assembly 23 with dual offset devices may be implemented so as to reduce TMR due to TDS. For instance, the tape drive 10 may receive a magnetic tape cartridge 11 that includes a length of magnetic tape 14 (e.g., magnetic tape pack, magnetic tape media, and the like) wound on at least one reel 15. One or more controllers 18 of a recording system may be included for operating the tape drive 10 in accordance with commands received from a host system 20 received at an interface 21. The tape drive 10 may be coupled to the host system 20 in a number of manners such as directly, through a library, or over a network (e.g., via Small Computer Systems Interface (SCSI), Fibre Channel Interface, and the like). The tape drive 10 may be a standalone unit or form part of a tape library or other data storage system.

The magnetic tape cartridge 11 may be inserted into the tape drive 10 and loaded by the tape drive 10 so that the tape 14 winds around a reel 16 of the tape drive 10 (e.g., in addition to one or more rollers or the like) and so that at least one recording head assembly 23 (or tape drive head assembly) of the recording system reads and/or writes information with respect to the magnetic tape 14 as the tape 14 is moved longitudinally in first/forward and/or second/reverse opposed directions by one or more motors 25 past the recording head assembly 23. For instance, the recording head assembly 23 may include two side-by-side heads that are separately actuated and that each include adjacent bumps and each head includes a series of servo, read, and/or write elements (e.g., transducers) configured according to the present description.

The recording system may include a servo control or tracking system 27 to electronically switch from one head to another head of the assembly 23, to seek and move the heads in assembly 23 laterally relative to the tape 14, to position the heads of assembly 23 at a desired location over the tape 14 and/or one or more tracks of the tape 14, to follow one or more desired tracks, and/or the like. The various components of the tape drive 10 may be incorporated or otherwise embodied within any appropriate housing (not shown). The servo control system 27 may also control the operation of the motors 25 through motor drivers 28 in response to instructions by the one or more controllers 18, where the controllers 18 may provide the data flow and formatting of data to be read from and written to the magnetic tape 14 (e.g., via employing a buffer 30 and a recording channel 32).

Figure 2:
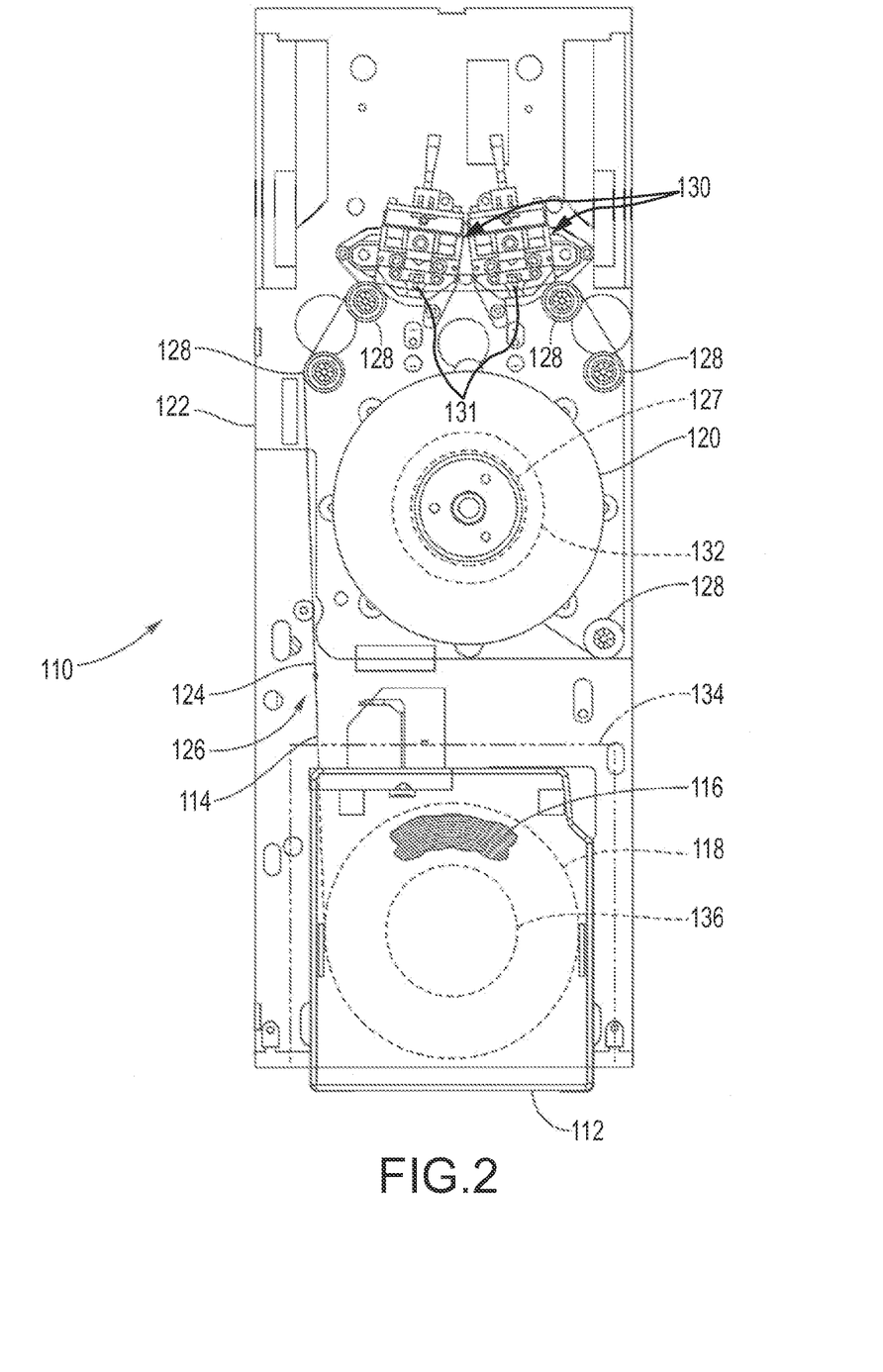
FIG. 2 is a plan view of a tape drive according to one embodiment that may include a recording head assembly as taught herein.

Further, before discussing particulars of the recording head assembly design in more detail, FIG. 2 illustrates one particular type of tape drive 110 in which the disclosed utilities may be implemented. Broadly, the tape drive 110 is operable to write data to and/or read data from a supply reel 118 of tape 116 (e.g., magnetic tape) of a tape cartridge 112. The tape drive 110 may have a take-up reel 120 that is rotatably supported on a drive body or housing 122. A drive leader 124 of the take-up reel 120 may be attachable to a cartridge leader 114 of the tape cartridge 112 so as to pull the cartridge leader 114 and tape 116 along a tape path 126 to the take-up reel 120. The drive leader 124, cartridge leader 114 and tape 116 are configured to wrap around a reel hub 127 of the take-up reel 120 such that the tape 116 and leaders 114 and 124 form a tape pack. The tape drive 110 may further include one or more guide members, such as rollers 128, for guiding movement of the drive leader 124, cartridge leader 114 and tape 116 along the tape path 126.

More significantly, the tape drive 110 includes one or more recording head assemblies 130 (or "tape drive head assemblies") for performing read and/or write operations on the tape 116, and each assembly 130 includes dual offset devices provided by side-by-side heads (as shown generally at 131) and as described below in detail. The tape drive 110 also includes a motor 132 for driving the take-up reel 120, e.g., having a stator that is non-movably secured to the housing 122. The drive 110 also includes a rotor that is rotatably positioned relative to the stator and that is rotated upon passing a current through a conductor of the motor and a cartridge receiver 134 for receiving the tape cartridge 112. Further, the cartridge receiver 134 may include a motor 136 that is configured to drive the supply reel 118 of the tape cartridge 112. Rollers 128, recording head assemblies 130, motors 132 and 136, and cartridge receiver 134 may be mounted in and supported by the housing 122.

Tape mis-registration (TMR) of the tape 114 can result from TDS as the width of the tape 114 may change between the writing by one of the recording head assemblies 130 and its heads 131 and the later reading by the same or differing ones of the assemblies 130. At this point in the discussion, it may be useful to describe how prior design approaches provide a next generation recording head assembly and then to describe how TMR due to TDS can better be handled (e.g., reduced by 50 percent with similar storage capacities) with the presently taught recording head assemblies that utilize dual offset devices to record with greater track density.

Figure 3:
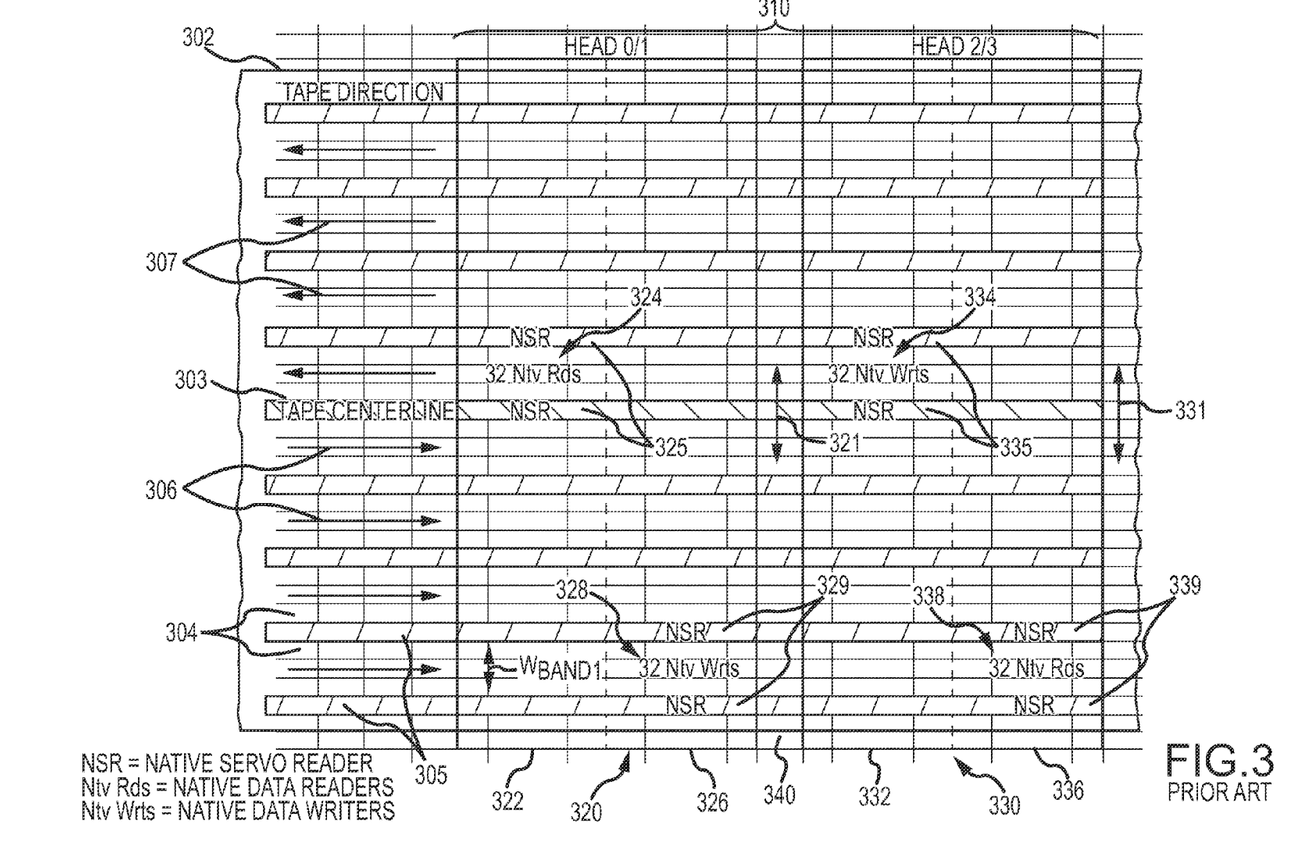
FIG. 3 is a schematic illustration of a conventional "previous" (or existing) generation recording head assembly being used to read and write data from and onto a magnetic storage tape or media.

FIG. 3 illustrates a conventional or "previous" generation recording head assembly 310 that may be used to write data onto a magnetic storage tape such as tape 302. The tape 302 has a tape centerline 303 and a particular width, which may vary some amount between writes and reads by assembly 310 causing TMR. The tape 302 further includes a number of bands 304 in which a plurality of data tracks are written between a pair of spaced apart servo bands or tracks 305, and each band has a first band width, $W_{Band1}$. During read/write operations, the tape 302 may move linearly along a first tape direction (e.g., along a tape path defined by components of a tape drive) shown with arrows 306 and then at a second time linearly along a second tape direction 307 (along the same tape path of the tape drive).

The head assembly 310 includes first and second heads 320, 330 that are separately actuated to position their read/write elements relative to the tape 302 (e.g., to step the elements across bands 304 to write/read tracks) as shown with arrows 321, 331. The heads 320, 330 are arranged to be side-by-side and spaced apart by a gap 340 in the head assembly 310. Each head 320, 330 is made up of two adjacent and, in this case, abutting bumps 322, 326 and 332, 336. In the first head 320, a set or group of write elements (or writers) 328 are provided on the second bump 326 between a first pair of servo readers 329, and, further, a set or group of read elements (or readers) 324 are provided on the first bump 322 between a second pair of servo readers 325 (spaced apart from the first pair of servo readers 329). In the second head 330, a set or group of read elements 338 are provided on the second bump 336 between a first pair of servo readers 339 while a set or group of write elements 334 are provided on the first bump 332 between a second pair of servo readers 335 (spaced apart from the first pair of servo readers 339).

During use of the assembly 310 with the tape 302 moving in the first direction 306, the servo readers 329, 339 may be used to actuate 321, 331 the heads 320, 330 so as to align the group of write elements 328 over data tracks of one of the bands 304 as well as to align the group of read elements 338 over this same set of data tracks. Then, during use of the assembly 310 with the tape 302 moving in the second direction 307, the servo readers 325, 335 may be used to actuate 321, 331 the heads 320, 330 so as to align the group of write elements 334 over data tracks of another one of the bands 304 as well as to align the group of read elements 324 over this same set of data tracks. In this way, the heads 320, 330 have their read and write elements positioned relative to two bands 304 at a particular time, and multiple passes after steps 321, 331 are taken are performed to write (and/or read) each of the bands 304.

Figure 4:
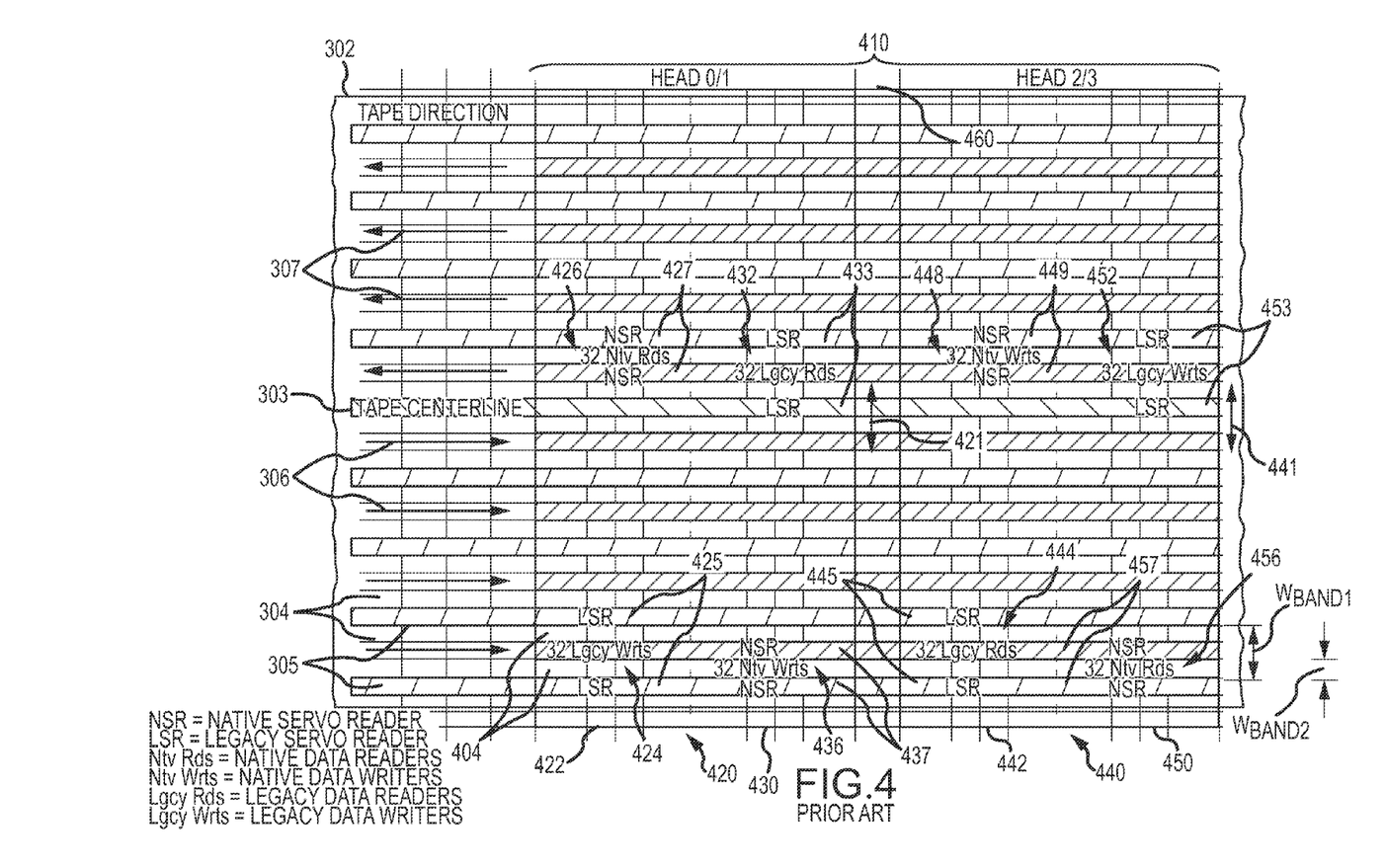
FIG. 4 is a schematic illustration of a conventional "next" generation recording head assembly being used to read and write data from and onto a magnetic storage tape (e.g., a tape with legacy formatting or with next generation formatting)

FIG. 4 is a schematic illustration of a conventional "next" generation recording head assembly 410 being used to read and write data from and onto a magnetic storage tape (e.g., a tape with legacy formatting or with next generation formatting) such as the tape 302 shown in FIG. 3. A design goal or object of the assembly 410 is to increase capacity of the tape media (e.g., by doubling capacity in this example), and this is shown with a reduction in width of new bands 404 relative to the previous generation or legacy bands 304 from a first width, $W_{Band1}$, to a second width, $W_{Band2}$, that is fifty percent less while still writing the same number of tracks (e.g., by providing the same number of write elements for this smaller width band 404 such as 32 elements in the present (but not limiting) example). Further, though, the head assembly 410 is configured to be able to read and write according to the legacy format of the tape used with head assembly 310 of FIG. 3.

To meet these design goals, the conventional next generation head assembly 410 includes two heads 420, 440 spaced apart by a gap 460 that are separately actuatable as shown with arrows 421, 441 as with head assembly 310. Legacy write elements 424, 452 are carried between legacy servo readers 425, 453 on the first bump 422 of the first head 420 and on the second bump 450 of the second head 440 to provide data writing in legacy format when the tape is moved in the first and second directions 306, 307, respectively. Likewise, legacy read elements 444, 432 are carried between legacy servo readers 445, 433 on the first bump 442 of the second head 440 and on the second bump 430 of the first head 420 to provide reading of data written in legacy format when the tape is moved in the first and second directions 306, 307, respectively.

Further, to provide writing and reading at the new or next generation format (e.g., in bands with half the width as shown at $W_{Band2}$), the head assembly 410 provides a set of write elements 436 between a pair of native (or new generation) servo readers 437 on the second bump 430 of the first head 420 and a set of read elements 456 between a pair of native (or new generation) servo readers 457 on the second bump 450 of the second head 440. The number of elements in each of these sets 436, 456 typically will be equal to the number of elements used in the sets 328, 338 of the previous generation head assembly 310 of FIG. 3 (e.g., 32 elements in this example) but these are provided in an element span ($W_{Band2}$) that is one half the size, which reduces the channel pitch in half also.

These sets 436, 456 are used in the head assembly 410 when the tape 302 is moved in the first direction 306. The assembly 410 further includes a set of write elements 448 between a pair of servo readers 449 on the first bump 442 of the second head 440 and a set of read elements 426 between a pair of native servo readers 427 on the first bump 422 of the first head 420. These elements are used for writing and reading data in tracks of the new generation bands 404 when the tape 302 is moved in the second direction 307. As will be understood, the addition of (or carrying) legacy read and write elements at the channel spacing of the previous generation adds to the complexity and cost of the recording head assembly 410. Additionally, spacing a large number (such as 32) of read/write elements in half ($W_{Band2}$) the previous element span ($W_{Band1}$) can cause issues when attempting to manufacture the head assembly 410 and can cause problems with cross talk between the elements of a write or read set during use of the assembly 410 to write or read data from the tape 302.

Figure 5:
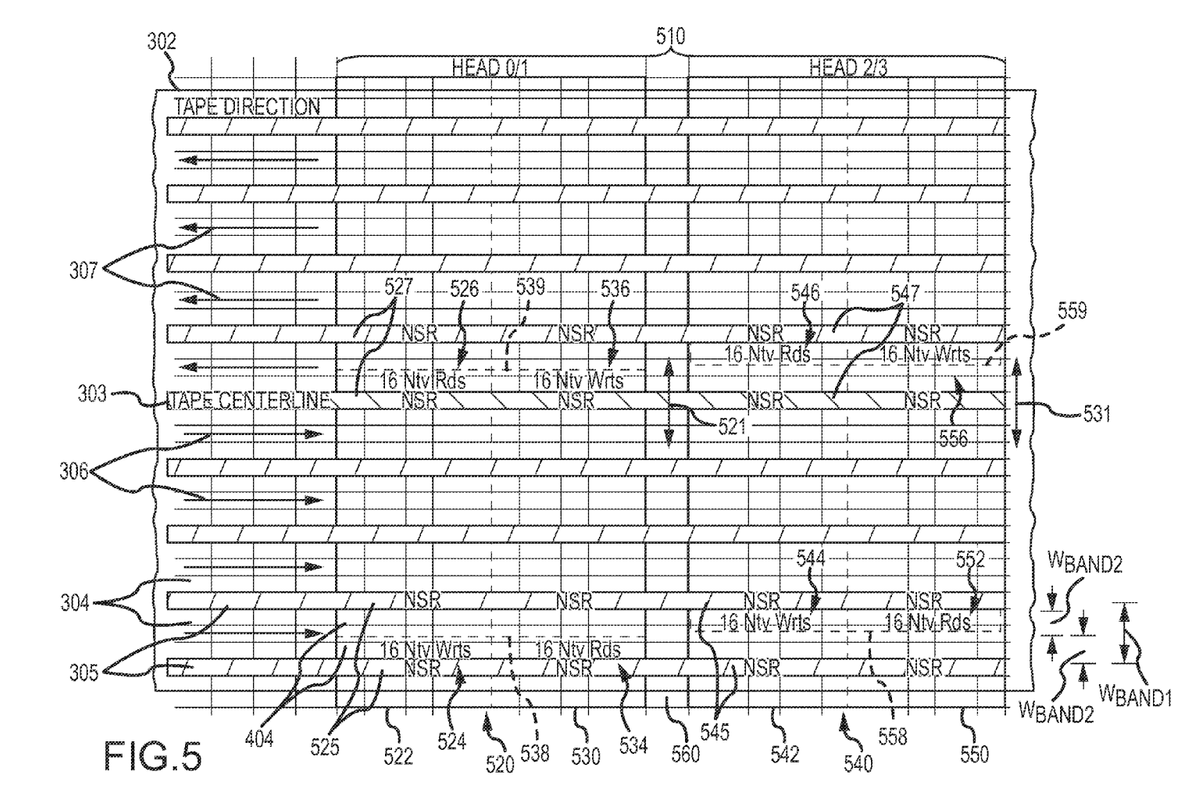
FIG. 5 is a schematic illustration similar to that of FIGS. 3 and 4 but showing a non-conventional or new "next" generation recording head assembly being used to read and write data from and onto a magnetic storage tape (which may have legacy formatting or may have next generation formatting)

The inventors recognized that it is desirable to provide increased storage capacity with a tape drive by reducing track mis-registration (TMR) due to TDS without spacing the read and/or write elements more closely than in prior generation assemblies and/or by adding addition read or write elements for legacy purposes. To this end, FIG. 5 provides a schematic illustration (similar to that of FIGS. 3 and 4) showing a non-conventional or new "next" generation recording head assembly 510 being used to read and write data from and onto a magnetic storage tape (which may have legacy formatting or may have next generation formatting) 302. Interestingly, the tape 302 that may be used with the head assembly 510 may use or include the original servo pattern for legacy and native formats while obtaining an increased track density. This can be seen with servo bands or tracks 305 at a spacing, $W_{Band1}$, that matches that used with head assembly 310 of FIG. 3, but the head assembly 510 can be used to write and read tracks at an increased density to increase capacity. This is achieved with writing and reading in bands or sub-bands 404 having a reduced width, $W_{Band2}$, with subsets of elements positioned in a dual offset arrangement as discussed below.

Figure 6:
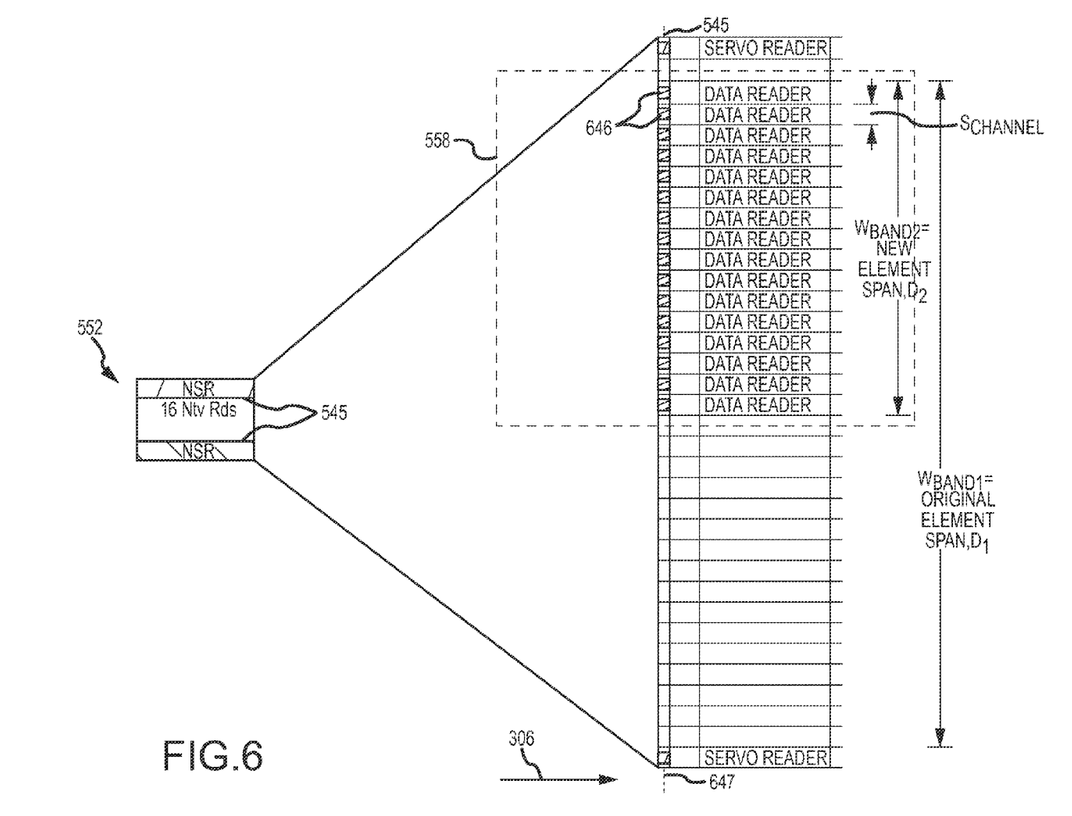
FIG. 6 illustrates an enlarged schematic of one subset of read elements provided on a bump of a head of the recording head assembly of FIG. 5.

As shown, the head assembly 510 includes a pair of separately actuatable (as shown with arrows 521, 531) heads 520, 540 that are spaced apart by gap 560. The first head 520 includes first and second bumps 522, 530 that may be spaced apart or abutting as shown. In the first bump 522, a first subset or segment of write elements 524 is provided between a pair of servo readers 525 that are spaced apart a distance equal to the width, $W_{Band1}$, of a legacy band 304 of a tape 302. In the second bump 530, a first subset or segment of read elements 534 is provided between the servo readers 525 (or additional readers aligned with the readers 525). The first subsets of write and read elements 524, 534 are arranged in a linear manner (as shown in FIG. 6) often so as to be parallel to longitudinal axes of the bumps 522, 530 (which are transverse to the direction of tape travel shown at 306, 307 of the tape 302 relative to the head assembly 510). Further, the first subsets or segments of write and read elements 524, 534 are positioned in a region or strip (outlined with dashed line 538) of the bumps 522, 530 that corresponds with a lower half of the space between the servo readers 525 and with a lower (or first) half 404 of a legacy tape band 304. Pairs of the write and read elements of the subsets 524, 534 are typically aligned for use in writing and reading a track as the tape 302 is passed over the assembly 510.

The second head 540 includes first and second bumps 542, 550 that may be spaced apart or abutting as shown. In the first bump 542, a second subset or segment of write elements 544 is provided between a pair of servo readers 545 that are spaced apart a distance equal to the width, $W_{Band1}$, of a legacy band 304 of a tape 302. In the second bump 550, a second subset or segment of read elements 552 is provided between the servo readers 545 (or additional readers aligned with the readers 545). The second subsets of write and read elements 544, 552 are arranged in a linear manner (as shown in FIG. 6) often so as to be parallel to longitudinal axes of the bumps 542, 550 (which are transverse to the direction of tape travel shown at 306, 307 of the tape 302 relative to the head assembly 510). Further, the second subsets or segments of write and read elements 544, 552 are positioned on the bumps 542, 550 so as to be within a region or strip (outlined with dashed line 558) that corresponds with an upper half of the space between the servo readers 545 and with an upper (or first) half 404 a band 304 of a legacy tape 302. Pairs of the write and read elements of the subsets 544, 552 are typically aligned for use in writing and reading a track as the tape 302 is passed over the assembly.

As shown, the head assembly 510 provides a next generation design for a head assembly (such as of assembly 310) by providing a set of write elements of a particular number (such as 32 in this non-limiting example) in an offset arrangement with a first subset 524 provided on a first head 520 and a second subset 544 on a second head 540. This may be thought of as offsetting of the write elements along the direction of tape travel over the head assembly 510. The subsets 524, 544, hence, together make up the full set of write elements used to concurrently (or nearly so) write within a band 304 of a tape 302. Further, though, the write elements of the subsets 524, 544 are offset in a longitudinal manner (e.g., along the longitudinal axes of the bumps 522, 542) such that each subset of elements 524, 544 spans a different region or portion of the original band width, $W_{Band1}$, e.g., with region or strip 538 of the first head 520 being longitudinally offset from the region or strip 558 of the second head and with each region or strip 538, 558 having a width, $W_{Band2}$, of a new generation tape band width (e.g., one half the previous generation band width, $W_{Band1}$).

This may be thought of as offsetting in a direction that is transverse to the direction of tape travel over the head assembly. Similar offsetting is provided for the first and second subsets of read elements 534, 552 in the heads 520, 540. The number of elements in each subset 524, 534, 544, 552 may be one half of that provided in the prior generation (such as 16 when the prior generation included 32 heads), with this smaller or fractional number of elements being provided in one half the element span or in a span equal to the new band width, $W_{Band2}$. These sets of write and read elements (each set being made up of two offset subsets 524/544 and 534/552) are used for writing and reading data from the tape 302 as it travels in a first direction 306. The write set may be thought of as a first band set of writing elements (e.g., elements that in combination are used to write data to tracks between a single pair of servo tracks or bands or that are located between aligned pairs of servo readers on the side-by-side heads 520, 540 of the head assembly 510), and the read set may be thought of as a first band set of reading elements.

Likewise, to write and read data in a second band as the tape 302 moves in the opposite or second direction 307, the second head 540 includes first and second bumps 542, 550 that may be spaced apart or abutting as shown. In the second bump 550, a third subset or segment of write elements 556 is provided between a pair of servo readers 547 that are spaced apart a distance equal to the width, $W_{Band1}$, of a legacy band 304 of a tape 302. In the second bump 542, a third subset or segment of read elements 546 is provided between the servo readers 547. The first subsets of write and read elements 556, 546 are arranged in a linear manner (as shown in FIG. 6) often so as to be parallel to longitudinal axes of the bumps 550, 542 (which are transverse to the direction of tape travel shown at 306, 307 of the tape 302 relative to the head assembly 510). Further, the third subsets or segments of write and read elements 556, 546 are positioned in a region or strip (outlined with dashed line 559) of the bumps 550, 542 that corresponds with an upper half of the space between the servo readers 547 and with an upper (or first) half 404 of a legacy tape band 304. Pairs of the write and read elements of the subsets 556, 546 are typically aligned for use in writing and reading a track as the tape 302 is passed over the assembly 510.

The first head 520 includes first and second bumps 522, 530 that may be spaced apart or abutting as shown. In the second bump 530, a fourth subset or segment of write elements 536 is provided between a pair of servo readers 527 that are spaced apart a distance equal to the width, $W_{Band1}$, of a legacy band 304 of a tape 302. In the first bump 522, a fourth subset or segment of read elements 526 is provided between the servo readers 527. The fourth subsets of write and read elements 536, 526 are arranged in a linear manner (as shown in FIG. 6) often so as to be parallel to longitudinal axes of the bumps 530, 522 (which are transverse to the direction of tape travel shown at 306, 307 of the tape 302 relative to the head assembly 510). Further, the fourth subsets or segments of write and read elements 536, 526 are positioned on the bumps 530, 522 so as to be within a region or strip (outlined with dashed line 539) that corresponds with a lower half of the space between the servo readers 527 and with a lower (or second) half 404 of a band 304 of a legacy tape 302. Pairs of the write and read elements of the subsets 536, 526 are typically aligned for use in writing and reading a track as the tape 302 is passed over the assembly.

As shown, the head assembly 510 provides a next generation design for a head assembly (such as of assembly 310) by providing a set of write elements of a particular number (such as 32 in this non-limiting example) in an offset arrangement with a third subset 556 provided on a second head 540 and a fourth subset 536 on a first head 520. This may be thought of as offsetting of the write elements along the direction of tape travel over the head assembly 510. The subsets 556, 536, hence, together make up the full set of write elements used to concurrently (or nearly so) write within a band 304 of a tape 302. Further, though, the write elements of the subsets 556, 536 are offset in a longitudinal manner (e.g., along the longitudinal axes of the bumps 550, 530) such that each subset of elements 556, 536 spans a different region or portion of the original band width, $W_{Band1}$, e.g., with region or strip 539 of the first head 520 being longitudinally offset from the region or strip 559 of the second head and with each region or strip 539, 559 having a width, $W_{Band2}$, of a new generation tape band width (e.g., one half the previous generation band width, $W_{Band1}$).

This may be thought of as offsetting in a direction that is transverse to the direction of tape travel over the head assembly. Similar offsetting is provided for the third and fourth subsets of read elements 546, 526 in the heads 540, 520. The number of elements in each subset 526, 536, 546, 556 may be one half of that provided in the prior generation (such as 16 when the prior generation included 32 heads), with this smaller or fractional number of elements being provided in one half the element span or in a span equal to the new band width, $W_{Band2}$. These sets of write and read elements (each set being made up of two offset subsets 556/536 and 546/526) are used for writing and reading data from the tape 302 as it travels in a second direction 307, and the sets may be thought of as a second band set of writing elements and a second band set of reading elements.

FIG. 6 illustrates a portion of the head assembly 510 in further detail to provide a further comparison between the new head assembly design and prior next generation head assemblies such as that shown in FIG. 4. Particularly, FIG. 6 shows the read element subset 552 that is provided between a pair of spaced apart servo readers 545 (which is provided on the bump 550 of head 540 in the assembly 510 as shown in FIG. 5). In the enlarged view provided in the right portion of FIG. 6, it can be seen that the subset 552 includes a number of read elements 646 arranged in a line or linear manner as shown with line/axis 647. The number may vary to practice the invention and is typically a fraction of a desired number of elements such as one half the number of elements of a previous generation head such as 16 elements when the previous head had 32 elements. When combined with another read element subset (such as subset 534 in FIG. 5) the number of elements equals the overall desired number (such as 32 elements). The line 647 of read elements 646 are arranged to be transverse (and even orthogonal in some cases) to the direction of travel of a tape as shown with arrow 306 (and as seen in FIG. 5).

The read elements 646 are placed within a region or strip 558 of head 540 that is the "upper" portion or span of the distance between the pair of servo readers 545. The distance between the two servo readers 545 corresponds with a band width, $W_{Band1}$, of a prior generation head and also of an original element span. In contrast, the region or strip 558 has a width, $W_{Band2}$, that is one half this original width, $W_{Band2}$, such that the elements 646 that are arranged across this region or strip 558 along line 647 have a much reduced element span at about one half the original element span of the previous generation head. In contrast to prior heads as shown in FIG. 4, the read elements 646 are spaced apart a distance, $S_{Channel}$, that defines channel spacing or pitch that is equal to that used in the prior generation head such that the elements 646 do not have to be spaced more closely together to achieve a desired higher track capacity, which limits concerns with cross talk and manufacturing complexities of tightly packed read or write elements of a recording head. A similar arrangement of write elements would be provided for corresponding write element subsets in the head assembly 510 such as in subset 544 of write elements so as to align the read elements with the write elements for accurate reading of tracks written with these write elements.

The dual offset heads of the recording head assembly 510 of FIG. 5 represent a recording head design that uses two segments of half the previous generation's element count (16, for example) on two separately actuated heads. The data readers and writers are positioned at the same spacing as the previous generation head, but they only span half the distance with one subset or an upper half on one head and a second subset or lower half on the other head of the recording head assembly. For example, one head contains sixteen elements matching the location of the prior generation head's upper sixteen elements and the other head contains sixteen elements matching the prior generation head's lower sixteen elements. The servo readers are positioned in the same places as in the prior generation head, e.g., just outside of the 32 element span (or combined element span of the two offset sets of write or read elements), so that no new servo stripes are needed. The position error signal from the two servo readers can be used in a manner that centers the active elements about or relative to the sixteen (or other number of) tracks on the tape for each of the two heads of the recording head assembly. The writer and reader element span is reduced by half in this example when compared with the previous generation head so that TMR due to TDS is also reduced by one half (or fifty percent).

While this disclosure contains many specifics, these should not be construed as limitations on the scope of the disclosure or of what may be claimed, but rather as descriptions of features specific to particular embodiments of the disclosure. Furthermore, certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software and/or hardware product or packaged into multiple software and/or hardware products. The above described embodiments including the preferred embodiment and the best mode of the invention known to the inventor at the time of filing are given by illustrative examples only.

We claim:

1. A tape drive for recording data on a magnetic storage tape, comprising:
    a recording head assembly; and
    a drive assembly guiding the magnetic storage tape past the recording head assembly along a tape path,
    wherein the recording head assembly includes:
        a first head and a second head spaced apart from the first head,
        a first subset of write elements arranged linearly on a bump of the first head to extend parallel to a longitudinal axis of the bump of the first head,
        a second subset of write elements arranged linearly on a bump of the second head to extend parallel to a longitudinal axis of the bump of the second head, wherein the first and second subsets of the write elements are offset from each other relative to the longitudinal axes of the bumps of the first and second heads and are concurrently operable to write data on the magnetic storage tape, and
    wherein the first and second subsets of write elements are concurrently positionable relative to the magnetic storage tape to write a plurality of tracks within a single band of the magnetic storage tape.

2. The tape drive of claim 1, wherein the first and second heads are separately actuatable to position the first and second subsets of the write elements relative to the magnetic storage tape.

3. The tape drive of claim 1, wherein the recording head assembly further includes a first pair of servo readers on a bump of the first head and a second pair of servo readers, aligned with the first pair of servo readers, on a bump of the second head and wherein the first subset of write elements is positioned to span a first portion of a gap between the first pair of servo readers and the second subset of write elements is positioned to span a second portion of a gap between the second pair of servo readers.

4. The tape drive of claim 3, wherein the first portion of the gap is a lower half of the gap between the first pair of servo readers and the second portion of the gap is an upper half of the gap between the second pair of servo readers.

5. The tape drive of claim 3, wherein the recording head assembly is free of additional servo readers, read elements, and write elements between the first and second pairs of servo readers.

6. The tape drive of claim 3, wherein the recording head assembly is positioned in response to position error signals from the servo readers to center the write elements relative to tracks of the magnetic storage tape.

7. The tape drive of claim 1, wherein the first subset of write elements comprises sixteen write elements and wherein the second subset of write elements comprises sixteen write elements, whereby thirty-two elements are provided for concurrently writing data to the band of the magnetic storage tape.

8. The tape drive of claim 1, wherein the recording head assembly further includes:
    a first subset of read elements arranged linearly on an additional bump of the first head to extend parallel to a longitudinal axis of the additional bump of the first head and to be aligned with the first subset of write elements of the first head, and
    a second subset of read elements arranged linearly on an additional bump of the second head to extend parallel to a longitudinal axis of the additional bump of the second head and to be aligned with the second subset of write elements of the second head, wherein the first and second subsets of the read elements are offset from each other relative to the longitudinal axes of the bumps of the first and second heads and wherein the first and second subsets of the read elements are operable to substantially concurrently read differing tracks from a band of the magnetic storage tape.

9. A recording head assembly for use in a tape drive, comprising:
    a first head with first and second bumps;

a second head positioned adjacent the first head and having first and second bumps, wherein the first and second heads are independently actuatable; and a set of write elements positionable with the first and second heads during writing data to a single band of tracks on a tape, wherein the set of write elements comprises a first subset including a number of the write elements positioned on the first bump of the first head and further comprises a second subset including remaining ones of the write elements positioned on the first bump of the second head.

10. The recording head assembly of claim 9, wherein the first subset of the write elements is positioned in a lower region of the first head and the second subset of the write elements is positioned in an upper region of the second head, whereby the write elements of the first and second subsets are longitudinally offset from each other along longitudinal axes of the bumps of the first and second heads.

11. The recording head assembly of claim 10, further including servo readers on the bumps spaced apart for reading servo tracks defining the band on the tape and wherein the first and second subsets of the write elements are disposed between opposite pairs of the servo readers to extend across about one half of a gap between the opposite pairs.

12. The recording head assembly of claim 11, wherein the write elements are centered relative to the tracks on the tape using a position error signal from the servo readers.

13. The recording head assembly of claim 9, further including a set of read elements aligned with the write elements for reading the tracks in the band on the tape, wherein the set of read elements comprises a first subset including a number of the read elements positioned on the second bump of the first head and further comprises a second subset including remaining ones of the read elements positioned on the second bump of the second head.

14. The recording head assembly of claim 13, wherein the first subset of the read elements is positioned in a lower region of the first head and the second subset of the read elements is positioned in an upper region of the second head, whereby the read elements of the first and second subsets are longitudinally offset from each other along longitudinal axes of the bumps of the first and second heads.

15. The recording head assembly of claim 9, further including an additional set of write elements for writing data to a second band of tracks on the tape, wherein the additional set of write elements comprises a first subset including a number of the write elements positioned on the second bump of the second head and further comprises a second subset including remaining ones of the write elements positioned on the second bump of the first head.

16. The recording head assembly of claim 15, further including an additional set of read elements aligned with the write elements of the additional set of the write elements for reading the tracks in the second band on the tape, wherein the set of read elements comprises a first subset including a number of the read elements positioned on the first bump of the second head and further comprises a second subset including remaining ones of the read elements positioned on the first bump of the first head.

17. A head assembly for a tape drive, comprising:
a first head with first and second bumps;
a second head positioned adjacent the first head and having first and second bumps;
a set of write elements for writing data to a band of tracks on a tape, wherein the set of write elements comprises a first subset including a number of the write elements positioned on the first bump of the first head and further comprises a second subset including remaining ones of the write elements positioned on the first bump of the second head;

servo readers on the bumps spaced apart for reading servo tracks defining the band on the tape, wherein the first subset of the write elements are disposed between a first pair of the servo readers on the first bump of the first head to extend linearly a first distance across a gap between the first pair of the servo readers and the second subset of the write elements are disposed between a second pair of the servo readers on the first bump of the second head to extend linearly a second distance across a gap between the second pair of the servo readers, wherein the band has a width equal to a combination of the first and second distances, and wherein the first subset of the write elements are longitudinally offset from the second subset of the write elements; and a set of read elements aligned with the write elements for reading the tracks in the band on the tape, wherein the set of read elements comprises a first subset including a number of the read elements positioned on the second bump of the first head and further comprises a second subset including remaining ones of the read elements positioned on the second bump of the second head.

18. The head assembly of claim 17, wherein the first subset of the read elements is positioned in a lower region of the first head and the second subset of the read elements is positioned in an upper region of the second head, whereby the read elements of the first and second subsets are longitudinally offset from each other along longitudinal axes of the bumps of the first and second heads.

19. The head assembly of claim 17, wherein the first subset of the write elements is positioned in a lower region of the first head and the second subset of the write elements is positioned in an upper region of the second head, whereby the write elements of the first and second subsets are longitudinally offset from each other along longitudinal axes of the bumps of the first and second heads.

20. The head assembly of claim 17, further including an additional set of write elements for writing data to a second band of tracks on the tape, wherein the additional set of write elements comprises a first subset including a number of the write elements positioned on the second bump of the second head and further comprises a second subset including remaining ones of the write elements positioned on the second bump of the first head.

21. The recording head assembly of claim 20, further including an additional set of read elements aligned with the write elements of the additional set of the write elements for reading the tracks in the second band on the tape, wherein the set of read elements comprises a first subset including a number of the read elements positioned on the first bump of the second head and further comprises a second subset including remaining ones of the read elements positioned on the first bump of the first head.

22. A tape drive for recording data on a magnetic storage tape, comprising:
a recording head assembly; and
a drive assembly guiding the magnetic storage tape past the recording head assembly along a tape path,
wherein the recording head assembly includes:
a first head and a second head spaced apart from the first head,
a first subset of write elements arranged linearly on a bump of the first head to extend parallel to a longitudinal axis of the bump of the first head and operable to write data on a first portion of a band on the magnetic storage tape, a second subset of write elements arranged linearly on a bump of the second head to extend parallel to a longitudinal axis of the bump of the second head and concurrently operable to write data on a second portion of the band differing from the first portion of the band, wherein the first and second subsets of the write elements are offset from each other relative to the longitudinal axes of the bumps of the first and second heads.

23. The tape drive of claim 22, wherein the recording head assembly further includes a first pair of servo readers on a bump of the first head and a second pair of servo readers, aligned with the first pair of servo readers, on a bump of the second head and wherein the first subset of write elements is positioned to span a first portion of a gap between the first pair of servo readers and the second subset of write elements is positioned to span a second portion of a gap between the second pair of servo readers.

24. The tape drive of claim 23, wherein the first portion of the gap is a lower half of the gap between the first pair of servo readers and the second portion of the gap is an upper half of the gap between the second pair of servo readers.

25. The tape drive of claim 22, wherein the first subset of write elements comprises sixteen write elements and wherein the second subset of write elements comprises sixteen write elements, whereby thirty-two elements are provided for concurrently writing data to the band of the magnetic storage tape.

* * * * *